_US009522692B2_

(12) United States Patent
Takahashi et al.

(10) Patent No.: US 9,522,692 B2
(45) Date of Patent: Dec. 20, 2016

(54) STEERING APPARATUS

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Yuji Takahashi, Obu (JP); Tomonori Sugiura, Yamatokoriyama (JP); Shoji Ishimura, Kashihara (JP); Tatsuro Kubota, Shiki-gun (JP); Shigeru Hoshino, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/059,691

(22) Filed: Mar. 3, 2016

(65) Prior Publication Data

US 2016/0264167 A1 Sep. 15, 2016

(30) Foreign Application Priority Data

Mar. 9, 2015 (JP) .................. 2015-046051

(51) Int. Cl.
*B62D 1/16* (2006.01)
*B62D 1/19* (2006.01)

(52) U.S. Cl.
CPC ................. *B62D 1/16* (2013.01); *B62D 1/195* (2013.01)

(58) Field of Classification Search
CPC ................... B62D 1/16; B62D 1/195
See application file for complete search history.

(56) References Cited

U.S. PATENT DOCUMENTS

| | | | | |
|---|---|---|---|---|
| 6,685,225 B2* | 2/2004 | Hancock | ............... | B62D 1/195 280/777 |
| 7,669,500 B2* | 3/2010 | Matsui | ................... | F16F 7/123 280/775 |
| 8,733,793 B2* | 5/2014 | Minamigata | .......... | B62D 1/195 280/777 |
| 8,887,596 B2* | 11/2014 | Uesaka | ................. | B62D 1/195 280/775 |

(Continued)

FOREIGN PATENT DOCUMENTS

| | | |
|---|---|---|
| JP | 2012-066779 A | 4/2012 |
| WO | 2012/035891 A1 | 3/2012 |

OTHER PUBLICATIONS

Oct. 6, 2016 Extended European Search Report issued in European Patent Application No. 16158964.3.

*Primary Examiner* — Faye M Fleming
(74) *Attorney, Agent, or Firm* — Oliff PLC

(57) ABSTRACT

A steering apparatus includes an upper bracket that supports a column jacket. The upper bracket includes a first member including a first top plate and fixed to the vehicle body, and a second member fixed to the first member and supporting the column jacket. The second member includes: a second top plate fixed to the first top plate, a pair of side plates extending downward from the second top plate and placed on both side of the column jacket; and a pair of restricted portions extended laterally from the pair of side plates, respectively. The first member includes a pair of restricting portions extending downward from the first top plate, the pair of restricting portions each including a second fixed portion fixed to its corresponding restricted portion.

2 Claims, 5 Drawing Sheets

(56) References Cited

U.S. PATENT DOCUMENTS

| | | | |
|---|---|---|---|
| 8,910,977 B2* | 12/2014 | Sakata | B62D 1/195 |
| | | | 280/777 |
| 2012/0272778 A1 | 11/2012 | Okada et al. | |
| 2015/0068352 A1* | 3/2015 | Heitz | B62D 1/16 |
| | | | 74/492 |
| 2016/0167696 A1* | 6/2016 | Tanaka | B62D 1/195 |
| | | | 74/492 |

* cited by examiner

STEERING APPARATUS

INCORPORATION BY REFERENCE

The disclosure of Japanese Patent Application No. 2015-046051 filed on Mar. 9, 2015 including the specification, drawings and abstract is incorporated herein by reference in its entirety.

BACKGROUND OF THE INVENTION

1. Field of the Invention

The present invention relates to a steering apparatus.

2. Description of Related Art

In a steering apparatus described in the following International Publication WO2012/035891, a vehicle body mounting bracket is attached to an outer column such that the vehicle body mounting bracket clamps the outer column from both right and left sides. The vehicle body mounting bracket includes a top plate attached to a vehicle body, and a pair of side plates extending downward from the top plate so as to clamp the outer column from both right and left sides. A front side, in a vehicle-body front-rear direction, of an upper end of the side plate on the right side is fixed to the top plate of the vehicle body mounting bracket by welding.

SUMMARY OF THE INVENTION

In the steering apparatus described in International Publication WO2012/035891, a deterioration caused by long-term use, an impact at the time of a secondary collision, or the like may release the fixations of the side plates to the top plate, thereby resulting in that a whole column jacket including the outer column clamped by the side plates may largely deviate from a predetermined mounting position. The invention provides a steering apparatus that can restrain a positional deviation of a column jacket due to fixation removal of a bracket.

A first aspect of the present invention relates to a steering apparatus including: a column jacket by which a steering shaft is roratably supported; and a bracket that supports the column jacket. The bracket is fixed to a vehicle body such that a first direction of the bracket is directed toward a front side in a vehicle-body front-rear direction and a second direction of the bracket is directed toward a rear side in the vehicle-body front-rear direction. The bracket includes a first member including a first top plate and fixed to the vehicle body, and a second member fixed to the first member and supporting the column jacket. The second member includes: a second top plate including a first fixed portion fixed to the first top plate, the first fixed portion being provided in an edge portion of the second top plate on a first-direction side; a pair of side plates extending downward from the second top plate and placed on both side of the column jacket; and a pair of restricted portions extended laterally from the pair of side plates, respectively. The first member includes a pair of restricting portions extending downward from the first top plate, the pair of restricting portions each including a second fixed portion fixed to a first-direction-side surface of its corresponding restricted portion.

According to the above aspect, even if fixations of the second fixed portions of the pair of restricting portions of the first member with respect to the first-direction-side surfaces of the pair of restricted portions of the second member are released, movements of the pair of restricted portions are restricted by the pair of restricting portions. Accordingly, the second member that supports the column jacket is held in a state where the second member is slightly rotated downward around the first fixed portion relative to the first member fixed to the vehicle body. Accordingly, even if the fixations of the second fixed portions are released, that is, even if fixation removal of the bracket occurs, it is possible to restrain such an excessive positional deviation of the column jacket that the whole column jacket is largely inclined.

In the above aspect, the first fixed portion may be fixed to the first top plate by welding and each of the second fixed portion may be fixed to its corresponding restricted portion by welding; and a welding length of the second fixed portion may be shorter than a welding length of the first fixed portion.

According to the above configuration, the welding length of the second fixed portion can be made shorter than the welding length of the first fixed portion. This shortens a time required for the welding, thereby making it possible to reduce cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
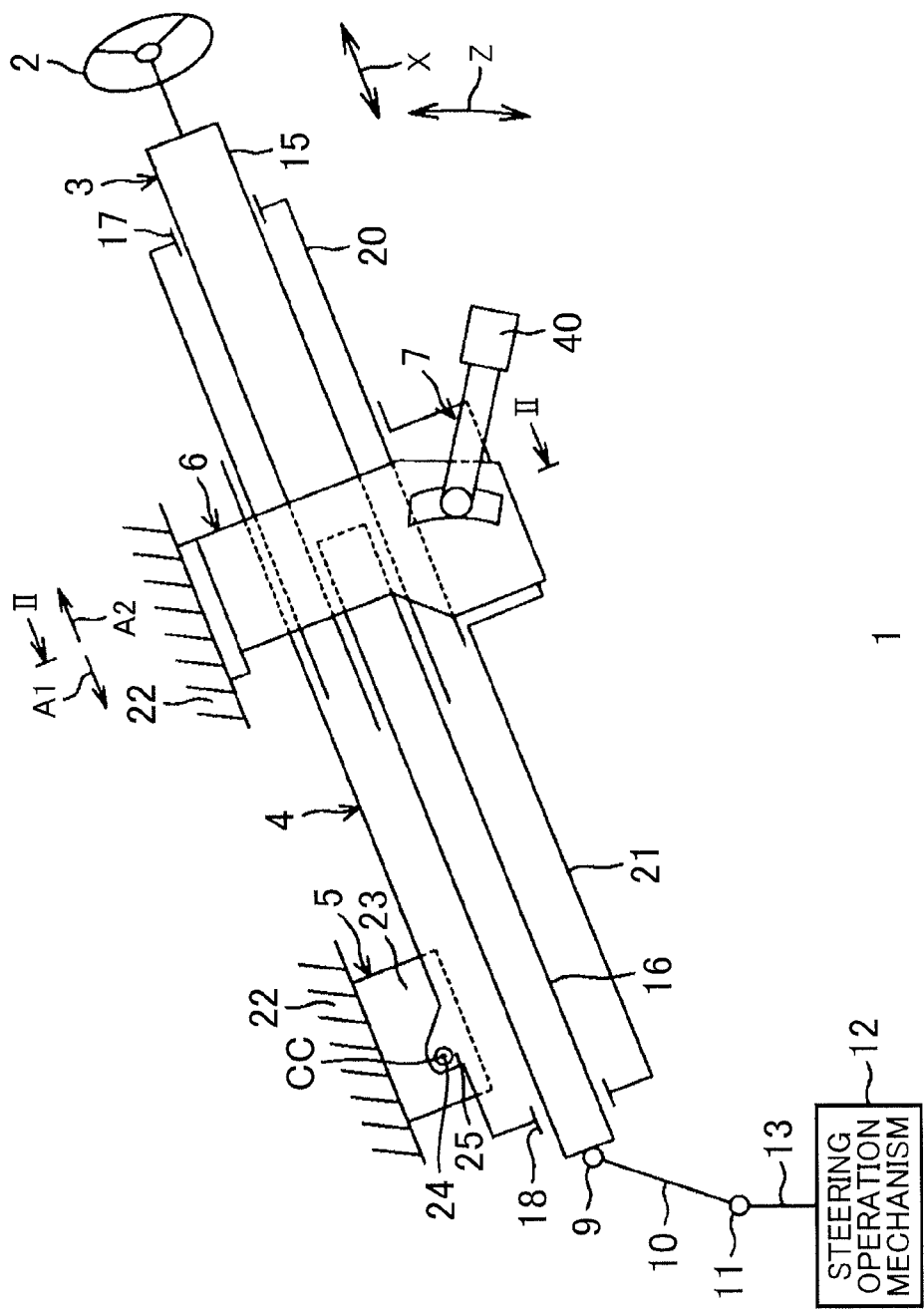
FIG. 1 is a schematic side view of a steering apparatus according to one embodiment of the present invention.

The following describes an embodiment of the invention in detail with reference to the attached drawings. FIG. 1 is a schematic side view of a steering apparatus 1 according to one embodiment of the present invention. Referring now to FIG. 1, the steering apparatus 1 includes a steering shaft 3, a column jacket 4, a lower bracket 5, an upper bracket (bracket) 6, and a fastening mechanism 7.

A steering member 2 such as a steering wheel is connected to a first end of the steering shaft 3 in an axial direction X. A second end of the steering shaft 3 in the axial direction X is connected to a pinion shaft 13 of a steering operation mechanism 12 sequentially via a universal joint 9, an intermediate shaft 10, and a universal joint 11. The steering operation mechanism 12 is, for example, a rack-and-pinion mechanism that steers a steered wheel (not shown) in association with steerage of the steering member 2. A rotation of the steering member 2 is transmitted to the steering operation mechanism 12 via the steering shaft 3, the intermediate shaft 10, and so on. Further, the rotation transmitted to the steering operation mechanism 12 is converted into an axial movement of a rack shaft (not shown). Hereby, the steered wheel is steered.

The steering shaft 3 includes a tubular upper shaft 15 and a lower shaft 16 that are fitted to each other by spline-fitting or serration-fitting, for example, in a relatively slidable manner. The steering shaft 3 is extendable in the axial direction X. The column jacket 4 includes an upper jacket 20 provided on a rear side in a vehicle-body front-rear direction, and a lower jacket 21 placed on a front side relative to the upper jacket 20 in the vehicle-body front-rear direction. The upper jacket 20 and the lower jacket 21 are slidable relative to each other in the axial direction X.

The upper jacket 20 rotatably supports the upper shaft 15 via a bearing 17. The lower jacket 21 rotatably supports the lower shaft 16 via a bearing 18. The column jacket 4 rotatably supports the steering shaft 3 via the bearings 17, 18. The column jacket 4 is extendable in the axial direction X together with the steering shaft 3.

The lower bracket 5 includes a fixed bracket 23 fixed to a vehicle body 22, a tilt support shaft 24 supported by the fixed bracket 23, and a column bracket 25 fixed to an outer peripheral surface of the lower jacket 21 and rotatably supported by the tilt support shaft 24. The column jacket 4 and the steering shaft 3 can pivot (tilt) in a tilt direction Z with a tilt center CC being taken as a fulcrum. The tilt center CC is a central axis of the tilt support shaft 24.

When the steering shaft 3 and the column jacket 4 are pivoted (tilted) around the tilt center CC, a position of the steering member 2 is adjusted (so-called tilt adjustment) in the tilt direction Z. Further, when the steering shaft 3 and the column jacket 4 are extended and contracted in the axial direction X, a position of the steering member 2 can be adjusted (so-called telescopic adjustment) in a telescopic direction (the axial direction X).

Figure 2:
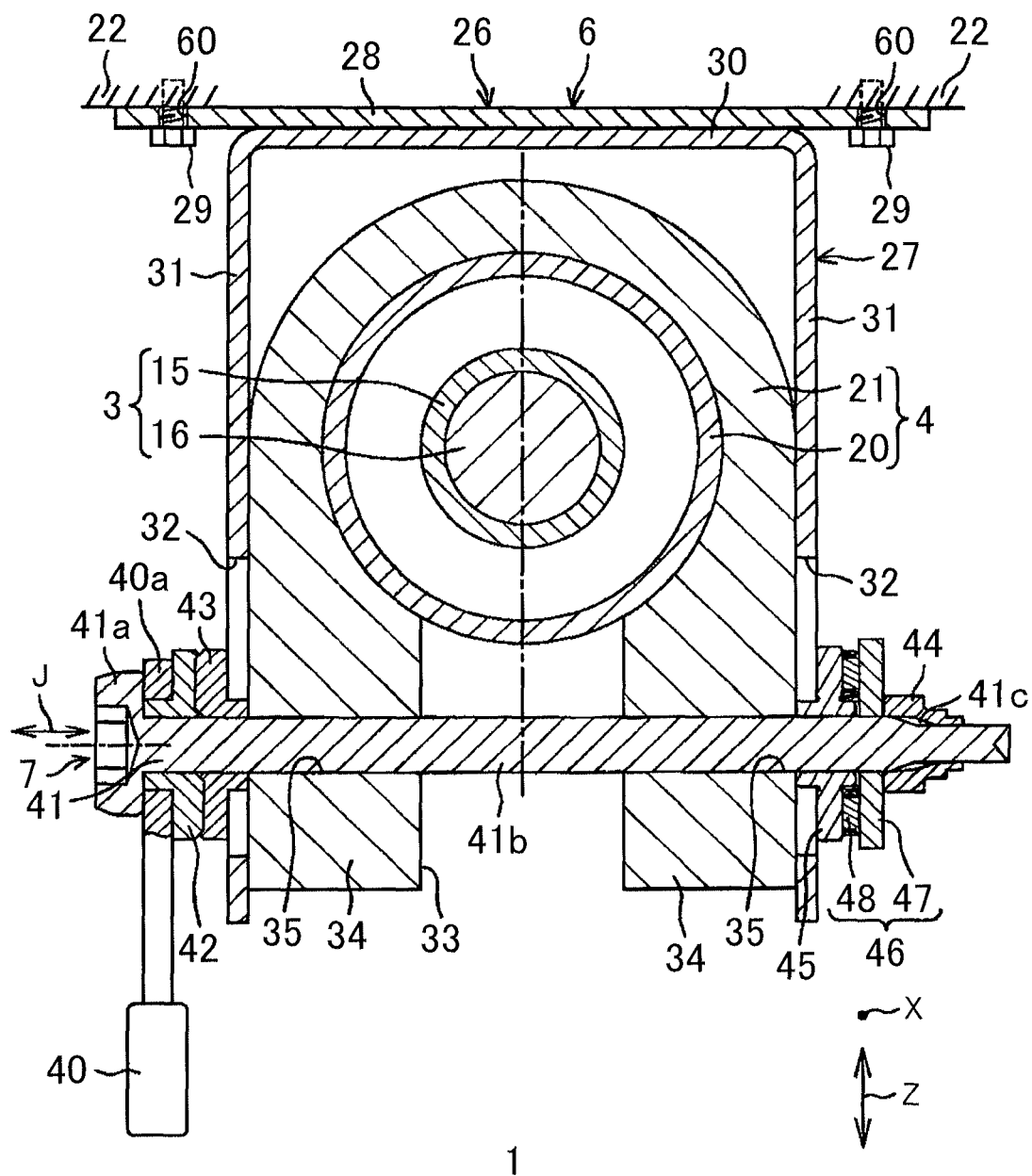
FIG. 2 is a sectional view taken along a line II-II in FIG. 1.
Figure 3:
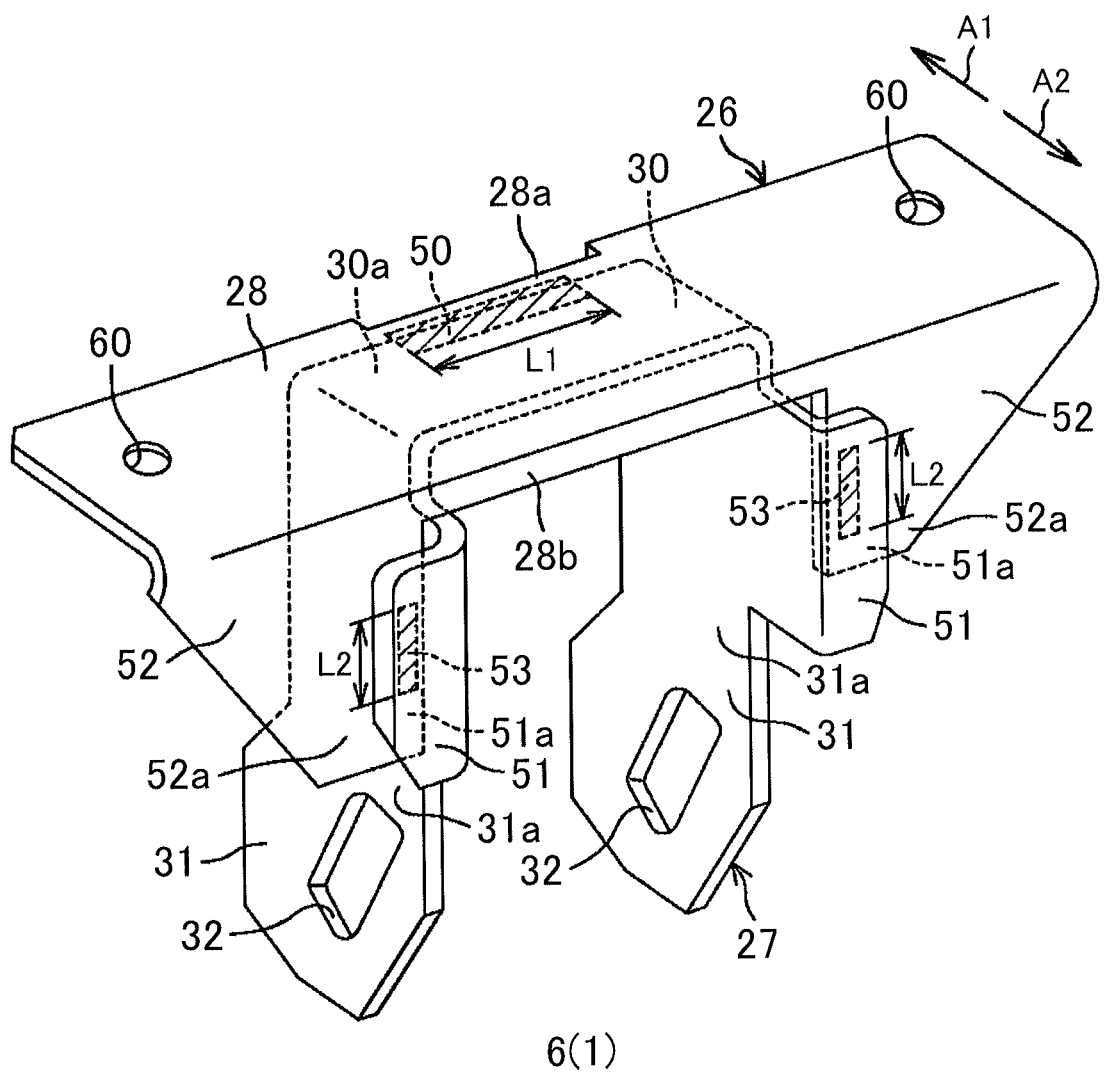
FIG. 3 is a perspective view of a bracket.

FIG. 2 is a sectional view taken along a line II-II in FIG. 1. FIG. 3 is a perspective view of the upper bracket 6. Referring now to FIG. 2, the upper bracket 6 includes a first member 26 fixed to the vehicle body 22, and a second member 27 fixed to the first member 26 so as to support the column jacket 4 (particularly, the lower jacket 21).

Referring now to FIG. 3, the first member 26 includes a generally rectangular first top plate 28. One direction along a short direction of the first top plate 28 is referred to as a first direction A1 of the upper bracket 6, and the other direction along the short direction of the first top plate 28 is referred to as a second direction A2 of the upper bracket 6. Referring now to FIG. 2, a pair of bolts 29 are inserted into insertion holes 60 provided on both ends of the first top plate 28 in its longitudinal direction. The first top plate 28 is fixed to the vehicle body 22 such that the pair of bolts 29 are screwed into the vehicle body 22. In this state, the first direction A1 of the upper bracket 6 is directed toward a front side in the vehicle-body front-rear direction, and the second direction A2 thereof is directed toward a rear side in the vehicle-body front-rear direction (see FIG. 1).

The second member 27 includes a second top plate 30 along the first top plate 28 from a lower side, and a pair of side plates 31 extending downward from the second top plate 30 and placed on both side of the column jacket 4 so as to clamp the column jacket 4. The pair of side plates 31 are opposed to each other. Each of the pair of side plates 31 has an elongate groove 32 for tilting such that the elongate groove 32 extends in the tilt direction Z.

The lower jacket 21 includes: a slit 33 formed in a lower part of the lower jacket 21 in the tilt direction Z so as to extend in the axial direction X from an upper end thereof in the axial direction X; and a pair of fastened portions 34 placed on both sides of the slit 33. The slit 33 is exposed on a front side and a rear side in the axial direction X and on a lower side in the tilt direction Z, toward an outside of the lower jacket 21. The pair of fastened portions 34 are provided integrally with the lower jacket 21. Each of the pair of fastened portions 34 has a fastening shaft passing hole 35 penetrating through the fastened portion 34.

The fastening mechanism 7 includes: an operating member 40 that is manually rotated by a driver or the like; a fastening shaft 41 having a first end attached to the operating member 40; a cam member 42 that rotates together with the operating member 40 in an integrated manner; and a first fastening member 43 that is a non-rotatable cam that achieves cam engagement with the cam member 42. The fastening shaft 41 is passed through a pair of elongate grooves 32 of the upper bracket 6 and the fastening shaft passing holes 35 of the pair of fastened portions 34. The fastening shaft 41 is rotatably supported by the lower jacket 21 via the pair of fastened portions 34.

A base end 40a, which is a first end of the operating member 40 in its longitudinal direction, the cam member 42, and the first fastening member 43 are supported by a shaft portion 41b of the fastening shaft 41 between a head 41a of the fastening shaft 41 and one side plate 31. A movement of the cam member 42 in an axial direction J relative to the fastening shaft 41 is restricted. The first fastening member 43 can move in the axial direction J of the fastening shaft 41. Further, the steering apparatus 1 includes a nut 44 threadedly engaged with a threaded portion 41 c of the fastening shaft 41, a second fastening member 45 provided between the other side plate 31 and the nut 44, and an intervening member 46 provided between the second fastening member 45 and the nut 44.

The second fastening member 45 and the intervening member 46 are supported by the shaft portion 41b of the fastening shaft 41 in the vicinity of the nut 44 so that the second fastening member 45 and the intervening member 46 are movable in the axial direction J of the fastening shaft 41. The intervening member 46 includes: a washer 47 provided between the nut 44 and the second fastening member 45; and a needle-shaped roller bearing 48 provided between the washer 47 and the second fastening member 45. When the cam member 42 rotates relative to a non-rotatable cam (the first fastening member 43) along with a rotation operation (a lock operation) to a lock direction of the operating member 40, the first fastening member 43 is moved in the axial direction J of the fastening shaft 41, so that both side plates 31 of the upper bracket 6 are clamped between the first fastening member 43 and the second fastening member 45. The pair of fastened portions 34 are fastened by the pair of side plates 31.

Hereby, the slit 33 between the pair of fastened portions 34 is narrowed so as to reduce a diameter of the lower jacket 21, so that the lower jacket 21 is pressure-contacted with the upper jacket 20 and the upper jacket 20 is held by the lower jacket 21. As such, when the fastening mechanism 7 fastens the pair of fastened portions 34 via the fastening shaft 41, the upper jacket 20 is held by the lower jacket 21, so that a tilt lock and a telescopic lock are attained.

When a rotation operation (an unlock operation) in a reverse direction to a previous rotation operation is performed on the operating member 40, the cam member 42 rotates relative to the non-rotatable cam (the first fastening member 43), so that the first fastening member 43 is moved in the axial direction J of the fastening shaft 41. Hereby, the fastening on the pair of side plates 31 by the first fastening member 43 and the second fastening member 45 is released, so that the clamping of both side plates 31 of the upper bracket 6 is released. Hereby, telescopic adjustment and tilt adjustment are performable again.

Figure 4:
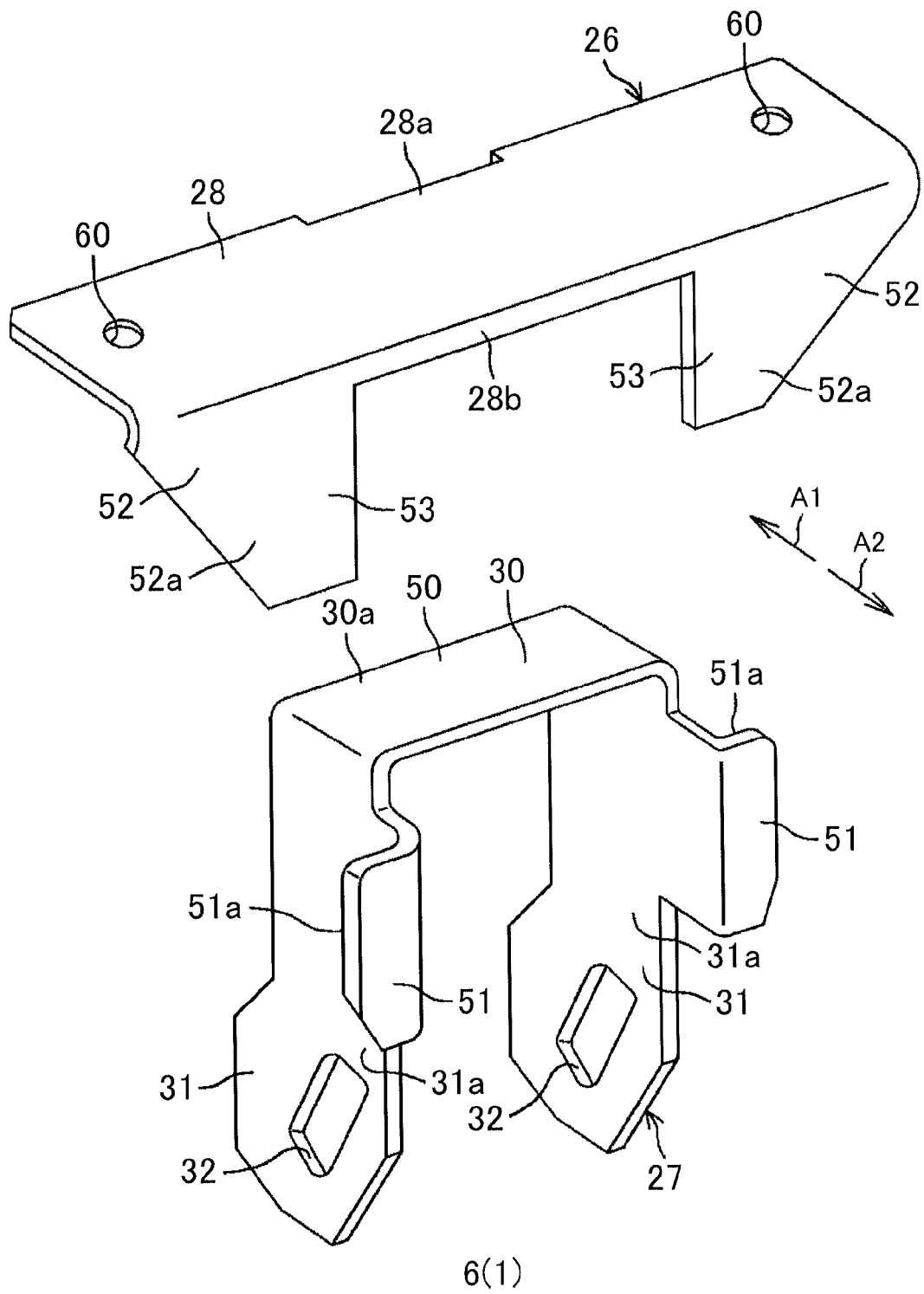
FIG. 4 is an exploded perspective view of the bracket.

FIG. 4 is an exploded perspective view of the upper bracket 6. With reference to FIG. 4, the second top plate 30 of the second member 27 is configured such that a first fixed portion 50 to be fixed to the first top plate 28 of the first member 26 is provided in an edge portion 30a on a first-direction-A1 side. The first fixed portion 50 is fixed to an edge portion 28a of the first top plate 28 on a first-direction-A1 side, by welding with a welding length L1 (see a hatching part in FIG. 3). In order to prevent falling-off of the second member 27, the welding length L1 is set to a dimension that satisfies a fixing strength between the first member 26 and the second member 27.

The second member 27 includes a pair of restricted portions 51 laterally extended respectively from edge portions 31a, on a second-direction-A2 side, of the pair of side plates 31. More specifically, the pair of restricted portions 51 extend so as to be distanced from each other toward the outside of the pair of side plates 31. The first member 26 includes a pair of restricting portions 52 respectively extending downward from an edge portion 28b, on the second-direction-A2 side, of the first top plate 28. Each of the pair of restricting portions 52 extends toward an outer side relative to its corresponding side plate 31. Second-direction-A2-side surfaces 52a of the pair of restricting portions 52 are opposed to first-direction-A1-side surfaces 51a of the pair of restricted portions 51 (see FIG. 3).

Each of the pair of restricting portions 52 includes a second fixed portion 53 to be fixed to the first-direction-A1-side surface 51a of its corresponding restricted portion 51. With reference to FIG. 3, the second fixed portion 53 is fixed to the first-direction-A1-side surface 51a of the restricted portion 51 by welding with a welding length L2 (see a hatching part). The welding length L2 of the second fixed portion 53 is shorter than the welding length L1 of the first fixed portion 50.

Figure 5A:
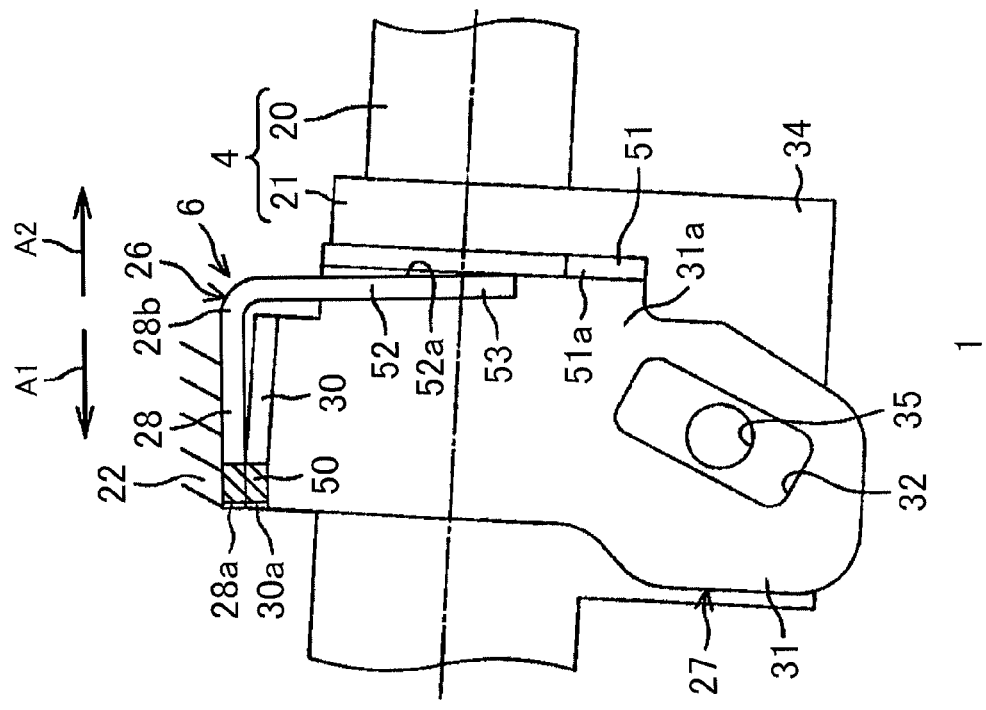
FIG. 5A is a side view around the bracket and illustrates a state where a second fixed portion is fixed to a restricting portion.
Figure 5B:
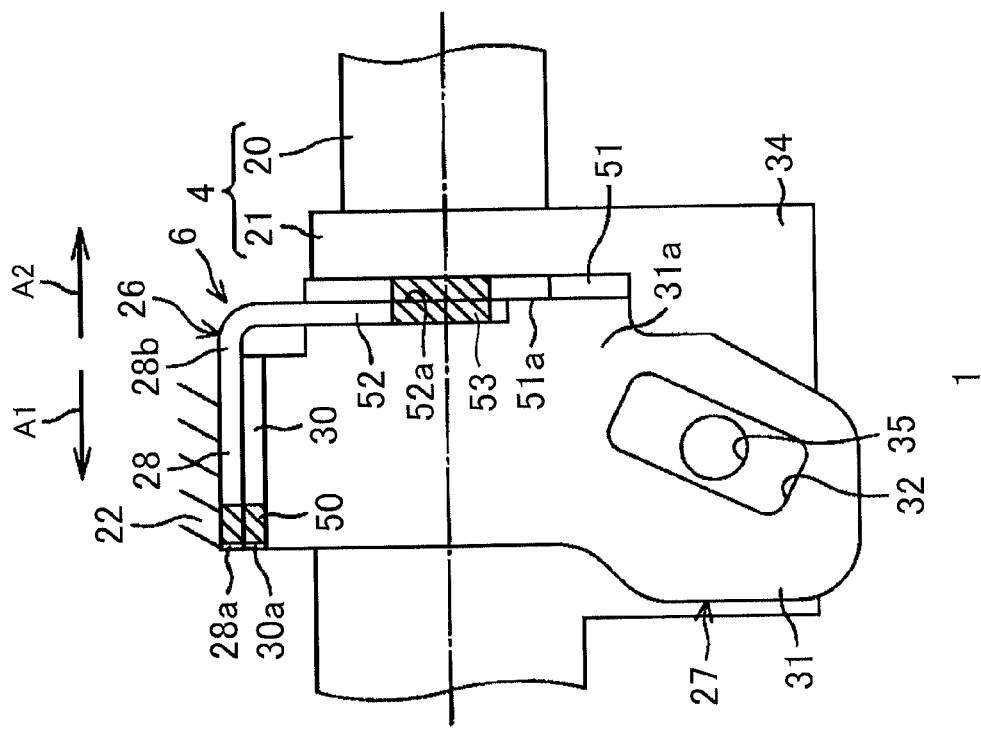
FIG. 5B is a view illustrating a state where a fixation of the second fixed portion to the restricting portion is released.

FIGS. 5A, 5B are side views around the upper bracket 6. FIG. 5A is a view illustrating a state where the restricted portion 51 is fixed to the restricting portion 52, and FIG. 5B is a view illustrating a state where the fixation of the restricted portion 51 to the restricting portion 52 is released. In FIGS. 5A, 5B, the bolt 29 and the fastening mechanism 7 are omitted for purposes of this description. As illustrated in FIG. 5A, the fixation of the first fixed portion 50 to the first top plate 28, and the fixations of the second fixed portions 53 of the pair of restricting portions 52 to the first-direction-A1-side surfaces 51a of the pair of restricted portions 51 are generally not released. However, depending on an impact or the like at the time of a secondary collision, it can be assumed that the fixations of the second fixed portions 53 might be released.

According to the present embodiment, even if the fixations of the second fixed portions 53 are released by any chance, the movement of the pair of restricted portions 51 of the second member 27 is restricted by the pair of restricting portions 52 of the first member 26, as illustrated in FIG. 5B. Accordingly, the second member 27 that supports the column jacket 4 is held in a state where the second member 27 is slightly rotated downward around the first fixed portion 50 relative to the first member 26 fixed to the vehicle body 22. Accordingly, even if the fixations of the second fixed portions 53 are released, that is, even if fixation removal of the upper bracket 6 occurs, it is possible to restrain such an excessive positional deviation of the column jacket 4 that the whole column jacket 4 is largely inclined.

Further, it is possible to restrain an excessive positional deviation of the column jacket 4 when the fixations of the second fixed portions 53 are released. Accordingly, the welding length L2 of the second fixed portions 53 can be made shorter than the welding length L1 of the first fixed portion 50 as much as possible. This shortens a time required for the welding, thereby making it possible to reduce cost. This invention is not limited to the embodiment described as above, and various modifications can be made within a scope of claims.

For example, the first fixed portion 50 may be fixed to a part, on the second-direction-A2 side, of the first top plate 28 rather than the edge portion 28a on the first-direction-A1 side. Further, each of the pair of restricted portions 51 may be extended laterally from a part, on the first-direction-A1 side, of its corresponding side plate 31 (e.g., an edge portion of the side plate 31 on the first-direction-A1 side) rather than the edge portion 31a on the second-direction-A2 side. Further, the pair of restricted portions 51 may extend toward an inner side of the side plates 31 (so as to come closer to each other).

Further, each of the restricting portions 52 may extend downward from a part, on the first-direction-A1 side, of the first top plate 28 (e.g., the edge portion 28a on the first-direction-A1 side) rather than the edge portion 28b on the second-direction-A2 side, provided that the each of the restricting portions 52 is placed on a first-direction-A1 side relative to its corresponding restricted portion 51. Further, the steering apparatus 1 may be provided with a tooth lock mechanism that locks a position of the upper jacket 20 relative to the lower jacket 21 due to engagement between teeth.

Further, the first top plate 28 may be provided with a capsule that removes the upper bracket 6 from the vehicle body 22 due to an impact at the time of a secondary collision. Further, the steering apparatus 1 is not limited to a manual-type steering apparatus in which steering of the steering member 2 is not assisted, but may be a column-assist electric power steering apparatus (C-EPS) in which steering of the steering member 2 is assisted by an electric motor.

What is claimed is:

1. A steering apparatus comprising:
   a column jacket by which a steering shaft is rotatably supported; and
   a bracket that supports the column jacket, the bracket being fixed to a vehicle body such that a first direction of the bracket is directed toward a front side in a vehicle-body front-rear direction and a second direction of the bracket is directed toward a rear side in the vehicle-body front-rear direction, wherein:
   the bracket includes a first member including a first top plate and fixed to the vehicle body, and a second member fixed to the first member and supporting the column jacket;
   the second member includes
      a second top plate including a first fixed portion fixed to the first top plate, the first fixed portion being provided in an edge portion of the second top plate on a first-direction side,
      a pair of side plates extending downward from the second top plate and placed on both sides of the column jacket, and
      a pair of restricted portions extended laterally from the pair of side plates, respectively; and
   the first member includes a pair of restricting portions extending downward from the first top plate, the pair of restricting portions each including a second fixed portion fixed to a first-direction-side surface of its corresponding restricted portion.

2. The steering apparatus according to claim 1, wherein:
the first fixed portion is fixed to the first top plate by welding and each of the second fixed portions is fixed to its corresponding restricted portion by welding; and
a welding length of the second fixed portion is shorter than a welding length of the first fixed portion.

\* \* \* \* \*